United States Patent
Khan et al.

(10) Patent No.: US 9,589,285 B2
(45) Date of Patent: Mar. 7, 2017

(54) REPRESENTATION MANIPULATION LANGUAGE

(75) Inventors: Ayub Khan, Cupertino, CA (US); Chandrashekar Basavaiah, San Ramon, CA (US)

(73) Assignee: eBay Inc., San Jose, CA (US)

( * ) Notice: Subject to any disclaimer, the term of this patent is extended or adjusted under 35 U.S.C. 154(b) by 417 days.

(21) Appl. No.: 13/431,550

(22) Filed: Mar. 27, 2012

(65) Prior Publication Data

US 2013/0262618 A1    Oct. 3, 2013

(51) Int. Cl.
| | |
|---|---|
| G06F 15/16 | (2006.01) |
| G06Q 30/06 | (2012.01) |
| H04L 29/08 | (2006.01) |
| G06F 12/00 | (2006.01) |

(52) U.S. Cl.
CPC ....... *G06Q 30/06* (2013.01); *H04L 29/08072* (2013.01)

(58) Field of Classification Search
CPC ................................ G06F 15/16; G06F 17/30
USPC .................. 709/217–219, 201–203
See application file for complete search history.

(56) References Cited

U.S. PATENT DOCUMENTS

| 8,346,809 | B2 * | 1/2013 | Breining et al. ............... 707/791 |
| 2002/0038349 | A1 * | 3/2002 | Perla et al. .................... 709/217 |
| 2008/0059651 | A1 * | 3/2008 | Ashwood Smith ........... 709/238 |
| 2009/0276771 | A1 * | 11/2009 | Nickolov et al. ............. 717/177 |
| 2010/0281166 | A1 * | 11/2010 | Buyya et al. .................. 709/226 |
| 2011/0137733 | A1 * | 6/2011 | Baird et al. ................ 705/14.68 |
| 2012/0166445 | A1 * | 6/2012 | Chakrabarti et al. ......... 707/742 |
| 2013/0073581 | A1 * | 3/2013 | Sandholm ..................... 707/769 |

OTHER PUBLICATIONS

NPL1: (Title: A class-based scheme for E-commerce web servers: Formal specification and performance evaluation; Jul. 2007 article; by Holton et al).*

* cited by examiner

*Primary Examiner* — Zarni Maung
(74) *Attorney, Agent, or Firm* — Schwegman, Lundberg & Woessner, P.A.

(57) ABSTRACT

Receiving data from a client machine, the data representing selection of a subset of components of a set of components of a fixed query response representation; performing a map/reduce function on the data to retrieve the subset of components; and transmitting the subset of components to the client machine. The data may include an Xpath expression that is created at the client machine or at a server and the map/reduce function may be performed according to a design pattern that designates the pattern of components in a fixed query response representation designated by the client machine.

28 Claims, 11 Drawing Sheets

- Xpath
  - Cart/paymentMethod
  - Cart/item[0]/price
- Map/Reduce
  - MAP: Cart/item[]/price
  - Reduce: sum (average, count etc.,)

- Xpath
  -Order/shippingAddress

REPRESENTATION MANIPULATION LANGUAGE

TECHNICAL FIELD

The present application relates generally to publication systems and methods, such as for electronic commerce, and in one specific example, to systems and methods for manipulating electronic commerce publication systems' search query response representations.

BACKGROUND

In an electronic publication, a user of a client machine can navigate within the system to obtain information about items (e.g., goods or services). This is typically accomplished using search queries entered at a client and sent to a server. The search queries are, or result in, database queries. Search queries typically enter the server by way of application programming interfaces (API's) and result in a fixed query response representation to the client.

BRIEF DESCRIPTION OF THE DRAWINGS

Some embodiments are illustrated by way of example and not limitations in the figures of the accompanying drawings.

The headings provided herein are for convenience only and do not necessarily affect the scope or meaning of the claimed invention.

DETAILED DESCRIPTION

In an electronic publication system such as, a user of a client machine can navigate within the system to obtain information about items (e.g., goods or services). This is typically accomplished using search queries entered at a client and sent to a server. The search queries are, or may result in, database queries. Search queries typically enter the server by way of application programming interfaces (API's), which may be public facing and private facing, and may result in a response to the client. An API typically provides a fixed query response representation, which may be a meaningful document that captures the state of the service provider, such as a publication system. However, the representation is a rigid document so that there may be no way for clients, or an intermediary application, to manipulate the API structure to address the client's particular use case. Consequently the client is unable, short of creation of a new API or modifying an existing API, to control the service end-to-end to achieve higher performance in terms of bandwidth, response time, and the like. Described in detail below is a system and method for manipulating a query response representation to match a client machine's need and to improve a server's capacity. This may be accomplished by using a Representation Manipulation Language ("RML") that provides a query language and a design pattern, and the ability to manipulate or configure the query response representation. This may allow the server to provide more processing power, bandwidth, throughput, and address latency issues for clients generally, and address mobile clients limited resources in terms of memory and CPU time.

The following description is presented to enable any person skilled in the art to create and use a computer system configuration and related method and article of manufacture to selectively manipulate query response representations provided by an electronic publication system without changing the associated API. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the embodiments may be practiced without the use of these specific details. In other instances, well-known structures and processes are shown in block diagram form in order not to obscure the description with unnecessary detail. Thus, the present disclosure is not intended to be limited to the embodiments shown, but is to be accorded the widest scope consistent with the principles and features disclosed herein.

Figure 1:
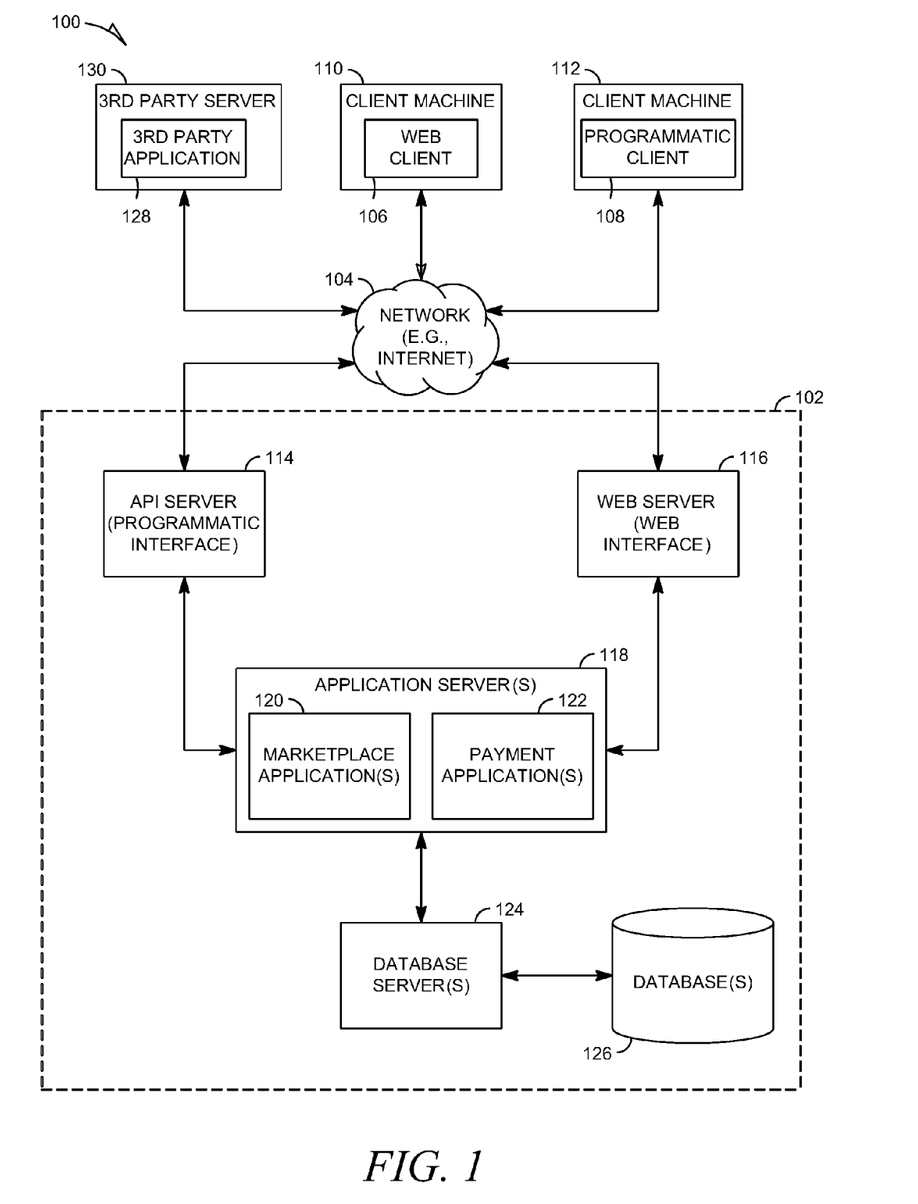
FIG. 1 illustrates a network diagram depicting an exemplary client-server system according to some embodiments.

FIG. 1 illustrates a network diagram depicting an exemplary client-server system 100 for providing selective electronic commerce publication system functions according to some embodiments. A networked system 102, in the example forms a network-based publication system that provides server-side functionality, via a network 104 (e.g., the Internet or Wide Area Network (WAN)) to one or more clients. FIG. 1 further illustrates, for example, a web client 106 (e.g., a browser, such as the Internet Explorer browser developed by Microsoft Corporation of Redmond, Wash.), and a programmatic client 108 executing on respective client machines 110 and 112. In one embodiment, the publication system comprises a marketplace system. In another embodiment, the publication system comprises other types of systems such as, but not limited to, a social networking system, an information retrieval system, and the like.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and may equally well find application in a distributed, or peer-to-peer, architecture system, for example. The various marketplace and payment applications 120 and 122 may also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
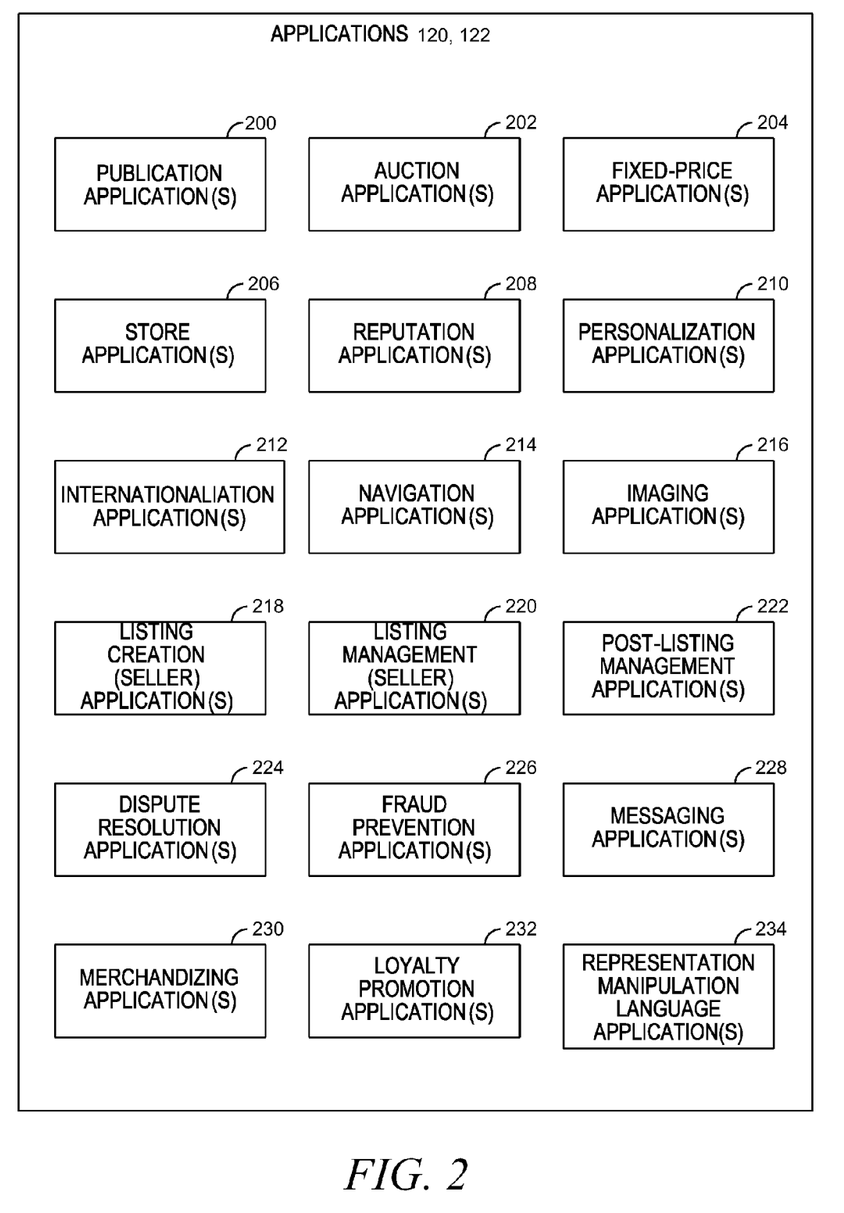
FIG. 2 illustrates a block diagram of additional details of applications included in the client-server system of FIG. 1.

FIG. 2 illustrates a block diagram of additional details of applications 120 and 122 according to some embodiments. Applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications or so as to allow the applications to share and access common data. The applications may furthermore access one or more databases 126 via the data servers 128.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users that transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 utilizing images that users may upload for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occurs post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages include, for example, advising users regarding the status of listings at the networked system 102 (e.g., providing "outbid" notices to bidders during an auction process or to provide promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and may be offered a reward for which accumulated loyalty points can be redeemed.

Representation Manipulation Language application(s) 234 supports various RML functions that are made available to clients to enable clients the ability to manipulate or configure query response representations. This allows the server to provide more processing power on behalf of clients, including but not limited to mobile clients. This application(s) allow handling of Xpath and Map/Reduce functions to manipulate query response representations. Xpath is a well known query language generally used for selecting nodes from an XML document. In addition, XPath may be used to compute values (e.g., strings, numbers, or Boolean values) from the content of an XML document. XPath was defined by the World Wide Web Consortium (W3C). Map/Reduce is also a well known software framework to support distributed computing on large data sets on clusters of computers. The framework is for processing highly distributable problems across huge datasets using a large number of computers, sometimes called nodes, and which may collectively be referred to as a cluster or a grid, depending on whether the nodes use the same hardware or different hardware. Computational processing can occur on data stored either in a file system (unstructured) or in a database (structured). In usual operation, in the "Map" step the master node takes the input, partitions it up into smaller sub-problems, and distributes them to worker nodes. A worker node may do this again in turn, leading to a multi-level tree structure. The worker node processes the smaller problem, and passes the answer back to its master node. In the "Reduce" step, the master node then collects the answers to all the sub-problems and combines them in some way to form the output—the answer to the problem it was originally trying to solve.

Figure 3:
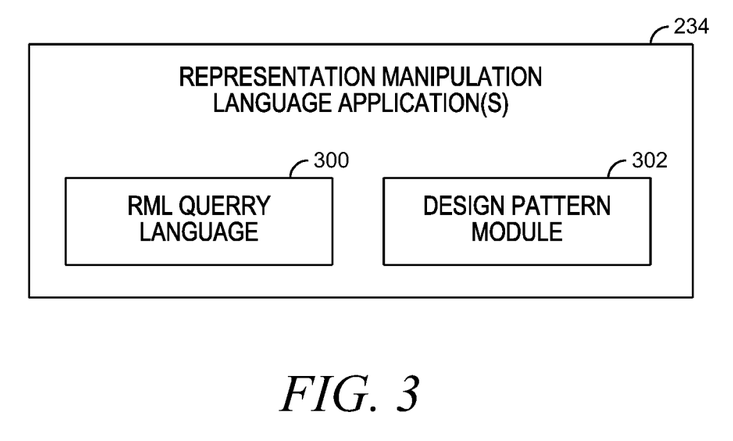
FIG. 3 illustrates a block diagram showing modules useful in manipulating query response representations of the client-server system of FIG. 1.

FIG. 3 illustrates a block diagram showing modules that may be included in the Representation Manipulation Language applications 234. These applications may comprise a Query Language module 300 and a Design Pattern module 302. In one embodiment, the Query Language module 300 is a server component that responds to Xpath operations and Map/Reduce operations and the Design Pattern module may be a server component that follows a design pattern to support the RML query language. In some embodiments, either or both of these modules may be transmitted to the client for complete or partial operation at the client instead of at the server. That is, the server may return the logic of the Query Language module and/or the Design Pattern module to the client or to some intermediary service for complete or partial operation.

Figure 4A:
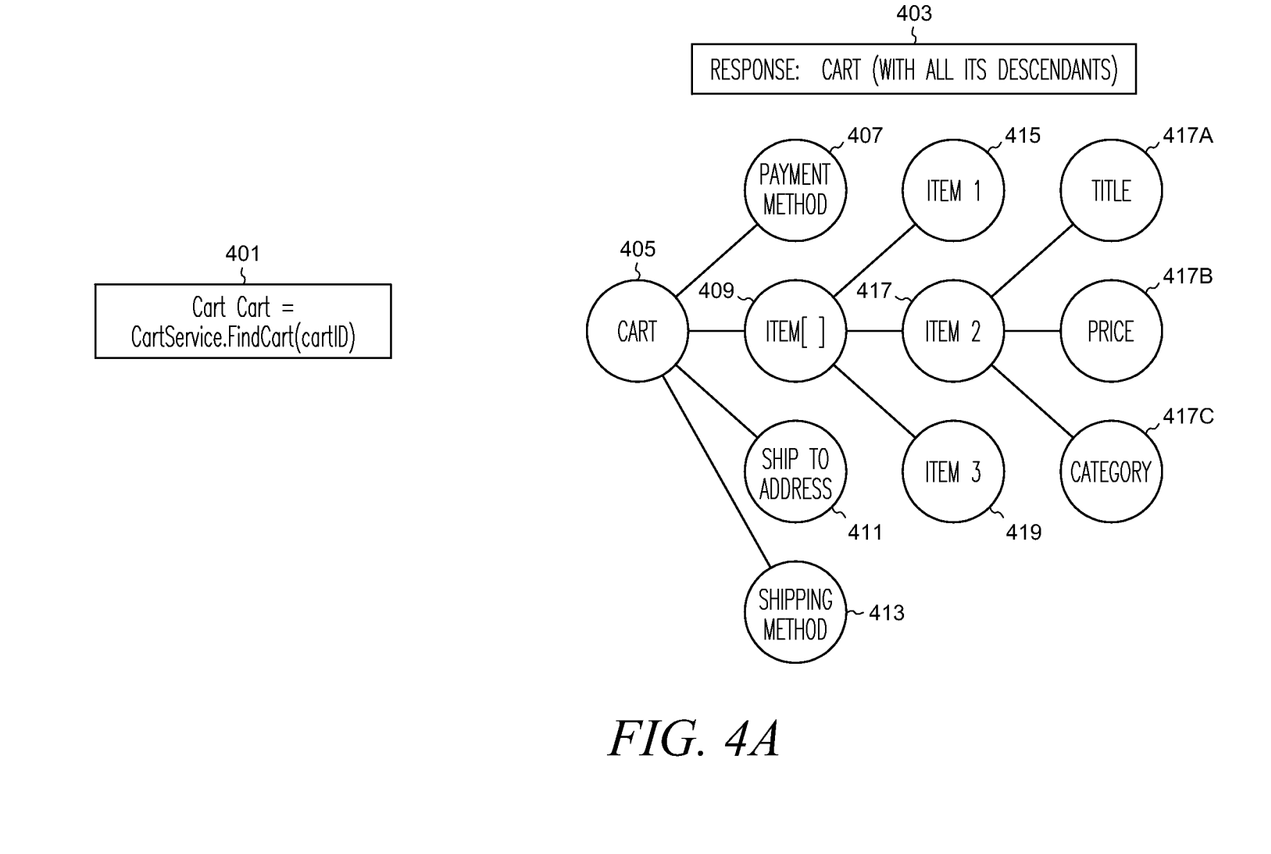
FIG. 4A illustrates a normal search query response representation for CartService.findCart(cartId).
Figure 4B:
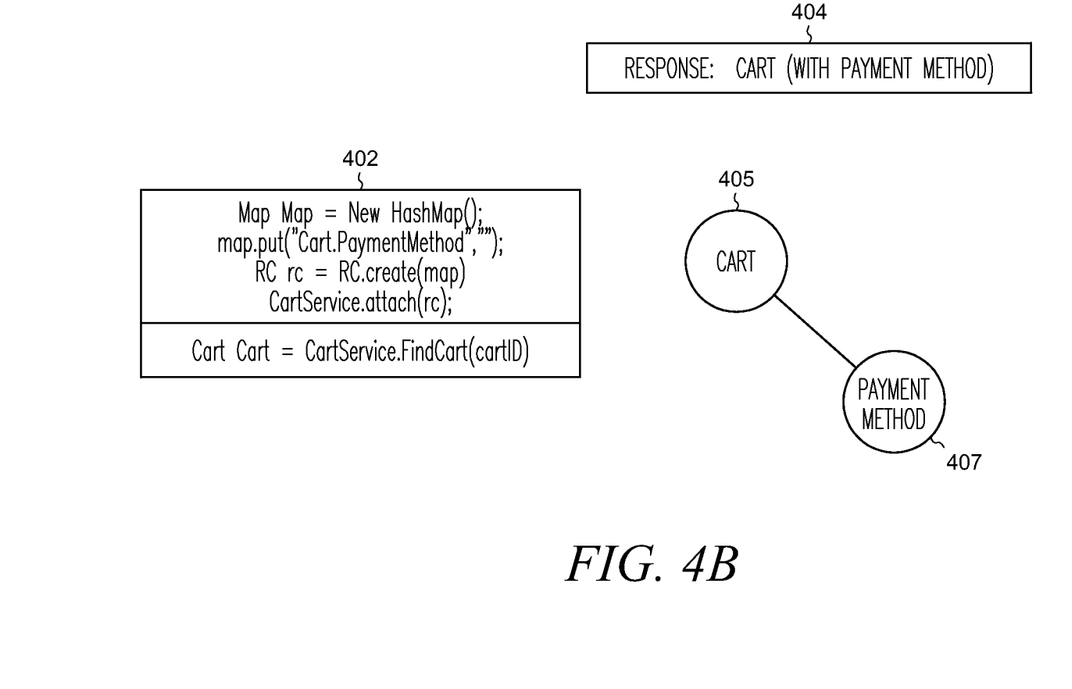
FIG. 4B illustrates search query response representation related to the example of FIG. 4A that results from using a manipulation response language.

FIGS. 4A and 4B illustrate examples of a use of RML in an embodiment involving addressing a virtual cart in an electronic publication system using "CartService.findCart (cartid)" in a method for finding the payment method in a virtual shopping cart. Other embodiments may be used.

FIG. 4A illustrates a normal request/response cart application in which a query, at a client, to view the cart results in the instruction seen at 401. This instruction evokes a fixed query response representation 403 illustrating the entire cart by nodes 405 with all its descendants, including payment method 407, items, 409, ship-to address 411, and shipping method 413. The items 409 would comprise its descendants item 1, at 415, item 2, at 417, and item 3, at 419, for an instance in which there are three items involved. Using item 2, at 417, as an example, item 2 would comprise the item title, at 417A, the item price, at 417B, and the item category, at 417C. This is a fixed query response representation and entails use of server components and compute power that the user may not need to use to obtain the information the user desires. This use of unneeded server components and compute power could be better used for improved client service and improved use or server capacity, as just one example. However, in the normal request/response used in publication systems the client has no way of specifying how much of the query response representation is desired. Consequently, the entirety of the query response representation is computed and presented.

FIG. 4B illustrates a method in which the client has a way of specifying how much of the query response representation is desired. Initially, a client may make a call to get the entire query response representation. Then, in one embodiment, using a well known type of tool that the server may specify in the response, which may be by using a response header such as an HTTP header, the client may select the desired nodes of FIG. 4A, sometimes referred to herein as designated nodes. Upon selection of nodes of FIG. 4A, the Xpath expression or map/reduce is formed. This will be represented as key/value pairs. An example may be:

Map filter=new Hash Map( );
    filter. Put("cart.paymentMethod","").

In this example, the client desires as a query response representation only the representation of the cart 405 and the payment method 413 of FIG. 4A. This can be accomplished by the query sequence seen in 402 of FIG. 4B. This sequence 402 is setting the XPath of the nodes for the representation. The first statement creates a key<->value map which is used to store 'Cart.paymentMethod' XPath expression in the second statement. The third statement is a representation context wrapping the map created in the first statement. In the fourth statement we attach this context to the CartService client application. This sequence will result in the query response representation of the cart 405 and the payment method 413 of FIG. 4B instead of the fixed result of FIG. 4A. The efficiency in server function is evident.

In an alternate embodiment, the client may transmit (key, value) pairs directly to the server so that the server is able to optimize the task of building the query response representation for the client as specified in the (key, value) pairs in the request. Again, these (key, value) pairs may be transmitted by the client using header information (HTTP headers). For orientation purposes, when reading this description of an alternate embodiment the line "CartSvc.createRepresentation(filter)" in the paragraph below would be doing that encoding of the key/value pairs by the client which may then be sent to the server. Exemplary code for the above function in this alternate embodiment may be:

```
Carts->find Cart(cartId)
    Map filter = new Hash Map( );
    filter. Put("cart.paymentMethod","");
    CartSvc.createRepresenationContext(filter);    PROGRAM
        NOTE//  Key/value pairs are encoded into the
        client request to be sent to server in the below
        statement]
```

```
Cart = CartSvc.findCart(String cartId);
    assertNotNull(cart->paymentMethod); // <-True
    assertNull(cart->shipToAddress); // <- True
```

Figure 5A:
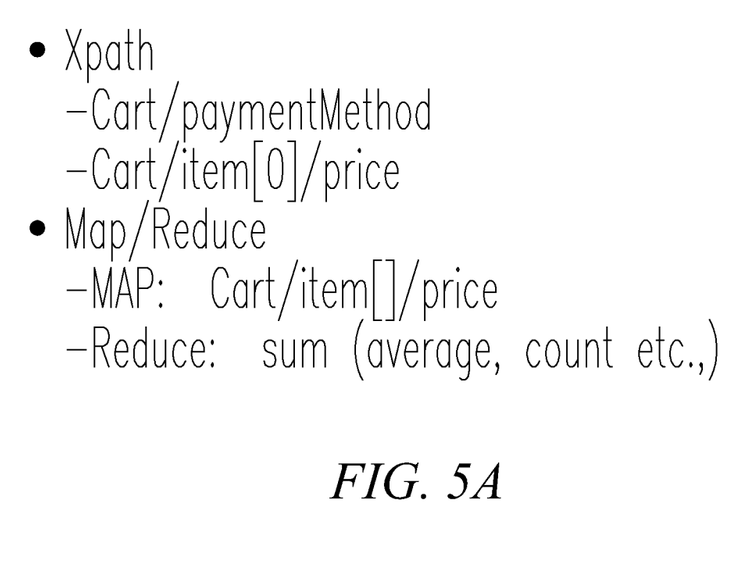
FIGS. 5A-5B illustrate exemplary flow diagrams illustrating operation of embodiments described herein.

With the above as background, and continuing, in one embodiment the client could be programmed to specify the xpath and map/reduce. This can be done by using a tool (FIG. 5A) exposed by the server, in which case the client application developer will choose certain icons of the node that is desired or designated by the client application. In another instance the client would discover the xpath and map/reduce capabilities of the server through the context of the API (CartService.findCart( ) FIG. 4A) exposed by the server. In practice the user will select the response desired by providing a search query at the client. This might be done by providing to the client an appropriate image with one or more selectable icons that allow the user to select the query response representation desired, as discussed above. As only one example, consider the nodes, or icons, 405, etc., of the shopping cart example of FIG. 4A. The image of FIG. 4A in which the various items 405, 407 . . . 417C are selectable may be presented to the client machine. If the user desires to view only the payment method and not the rest of the cart, the viewer might select payment method 407. This would cause the server Representation Manipulation Language application 234 of FIG. 2 to generate the Xpath and Map/Reduce functions seen in FIG. 5A. Here the Xpath would generate the function "Cart/Payment Method" that indicates that only the payment method from the cart is to be computed. As explained above, this may be performed at the client in one embodiment. Since the payment method is the query, the item and the price of the item are also included in the Xpath because these items may be viewed as integral to the payment method. That is, in FIG. 5A there are two Xpath expressions. In this case the server would return both the paymentMethod as well as the selected item with the price in the item. The RML application 234 may also generate the Map/Reduce function seen in FIG. 5A, which may then be executed in an operation by one or more computer processors. In this example, since the user desires or designates only the payment method, the Map function may be viewed as "Cart/item[ ]/price" where the number between the term [ ] is the item number. The Reduce function may be viewed as "sum (average, count, etc.)." A reduce function in this context is, as indicated briefly above, the name of commonly used functions in computation. These include 'sum' (find sum total of numerical values of the nodes found by the map function), 'average' (find average), and count (find number of nodes found by the map function). The term "etc." is added to indicate there could be more reduce functions as desired, even custom functions that the server may expose.

Figure 5B:
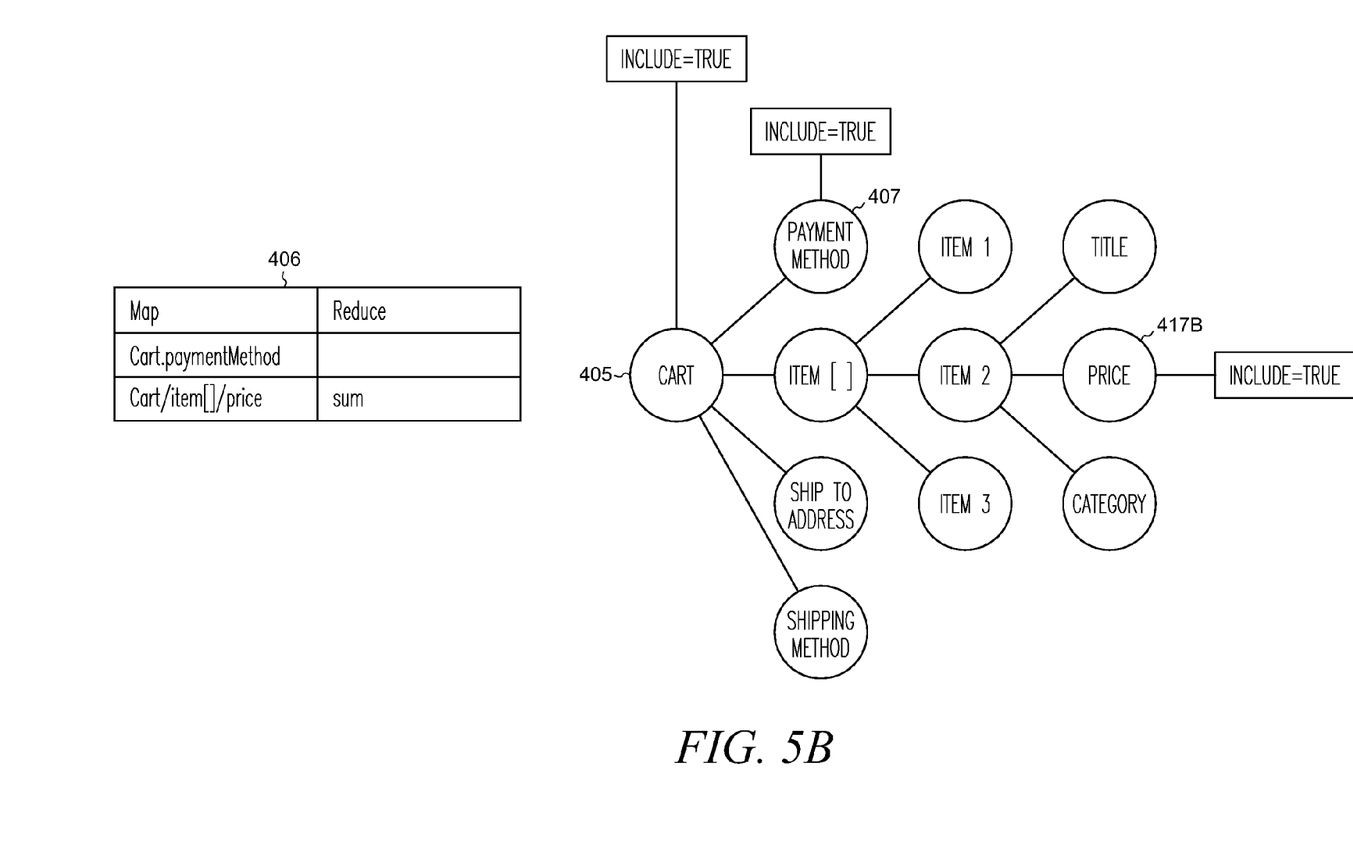

FIG. 5B illustrates a design pattern that may be used conceptually to support the RML query language. That is, a design pattern may be viewed as a map/reduce function designating the pattern of the components in a fixed query response representation that are desired or designated by the client machine. In this example, since the payment method of a selected item in the cart is desired, the functions included in the calculation that are (indicated as (Include=true) in FIG. 5B) are cart 405, payment method 407, and price 417B, as outlined conceptually by the "(Include=true)" boxes.

One may wonder why is "sum" opposite only "cart/item[ ]/price," and not also opposite "cart.paymentmethod" in box 406 of FIG. 5b? As one explanation, let us call the data structure a key<->value map. In this map, the key stores the Xpath expression or the map/reduce's map function, whereas the value is optional. The value is used to store the map/reduce's reduce function. From FIG. 5B, first instance usecase is for XPath expression, in which case the value is empty. Whereas in the second instance it is a map/reduce expression. It is instructing the server to return the sum total of all the items in the cart.

One may also wonder whether the terms item [ ] and item 2 should be included in the above. In our example, we used CART/ITEM[ ] to denote all the items of cart, and CART/ITEM[ ]/PRICE to denote the price element of all the cart items. In XPath to get price of all the item elements of cart, it is sufficient to denote it as 'CART/ITEM/PRICE'.

Code that illustrates the above functioning is seen below

```
Map filter = new HashMap( ); // Line 1
filter.put("cart.paymentMethod",""); // Line 2
filter.put("cart/item/price","sum"); // Line 3
RepresentationContext rc =
CartSvc.createRepresenationContext(filter); // Line 4
    CartSvc.attach(rc); // Line 5
    Cart cart = CartSvc.findCart(String cartId); // Line 6
    assertNotNull(cart->paymentMethod); // Line 7 - This should
    be True
    assertNotNull(cart->item[0].price); // Line 8 - This should be
True, also the value should be sum of all the price of items in the
cart
    assertNull(cart->shipToAddress); // Line 9 - This should be True
```

An explanation of the above code is as follows:
Line1—Define a map that could hold the xpath expression in Line2
Line2—Store xpath expression to denote that client is interested in 'cart.paymentMethod'
Line4—Create a context that holds the map from Line1
Line5—Attach the context to the Cart service
Line6—Finally the client application makes a call to the server. The cart object returned by this call will only have paymentMethod node inside the cart.
Line7—assert that the server returned 'paymentMethod' node
Line8—assert that the server returned 'item' node with the price (value=sum of the price of all the items in the cart)
Line9—assert that the server did not return 'shipToAddress'

Figure 6A:
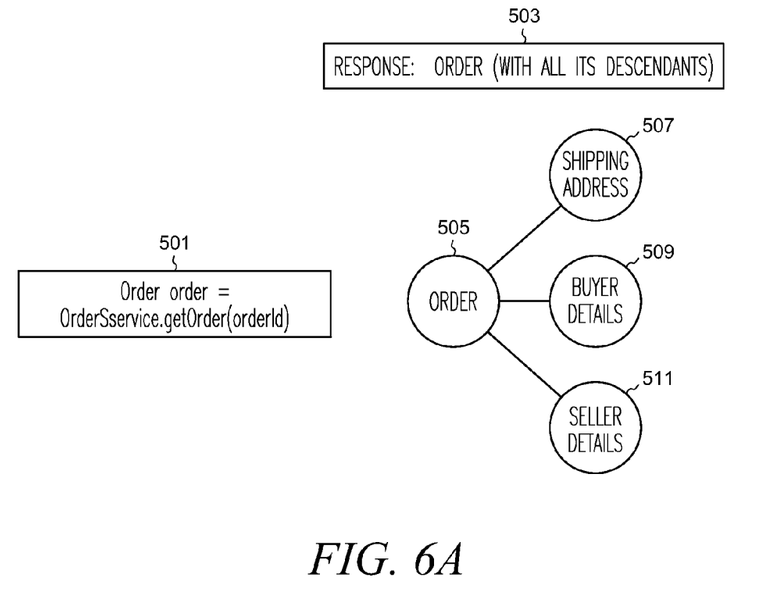
FIG. 6A illustrates a normal search query response representation for OrderService.findOrder(orderId).
Figure 6B:
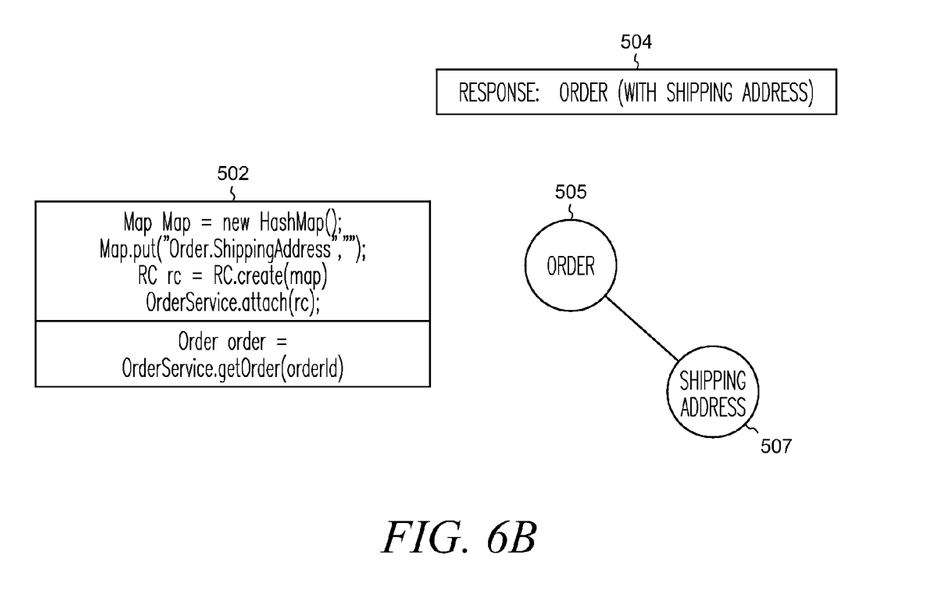
FIG. 6B illustrates search query response representation related to the example of FIG. 6A that results from using a manipulation response language.

An example of another embodiment may be "OrderService.findOrder(orderId)" in a method for finding the shippingAddress inside the Order as discussed with respect to FIGS. 6A and 6B. Those of ordinary skill in the art will recognize other embodiments based on the teachings of this written description. In this embodiment, FIG. 6A illustrates a normal request/response cart application in which a query, at a client, to view the cart results in the instruction seen at 501. This instruction evokes a fixed response 503 that provides the entire order 505 with all its descendents, including shipping address 507, buyer details, 509, and seller details 511. This is a fixed query response representation as was the case for the embodiment of FIG. 4A and entails use of server components and compute power that the user may not need to use to obtain the information the user desires. This use of unneeded server components and compute power could be better used for improved client service and improved use or server capacity, as just one example. However, as mentioned previously, because in the normal request/response used in publication systems, the client has no way of specifying how much of the query response representation is desired. Consequently, the entirety of the query response representation is computed and presented.

FIG. 6B illustrates a method in which the client has a way of specifying how much of the query response representation is desired in this embodiment. In this example, the client desires as a query response representation only the representation of the order 505 and shipping address 513. This can be accomplished by the query sequence seen in 502. This sequence 502 is setting the XPath of the nodes desired in the representation. The explanation of the statements is similar to that for FIG. 4A. This sequence will result in the query response representation of the order 505 and the shipping address 513 instead of the fixed result of FIG. 6A. The efficiency in server function is evident.

As to how the method begins, in one instance the client could be programmed to specify the Xpath and map/reduce. The explanation is similar to that in FIG. 5A.

Figure 7A:
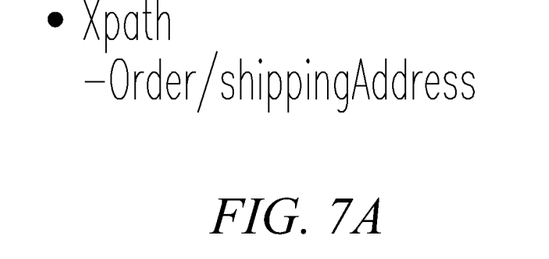
FIGS. 7A-7B illustrate exemplary flow diagrams illustrating operation of embodiments described herein.
Figure 7B:
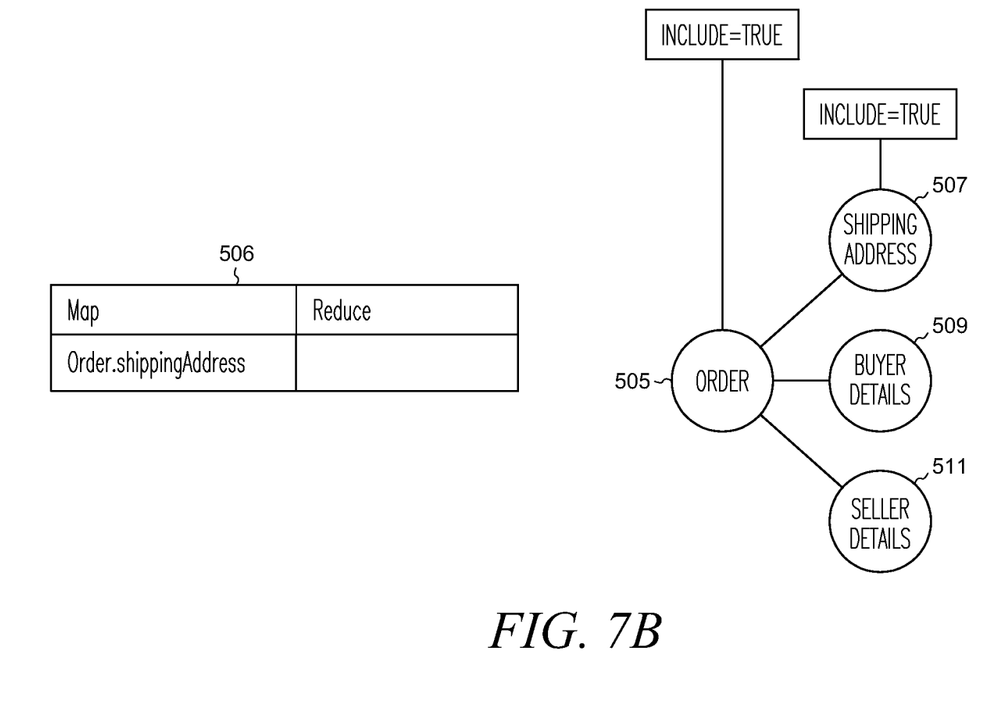

FIG. 7B illustrates a design pattern that may be used conceptually to support the RML query language. In this example, since the ("shipping address") in the order is desired, the functions included in the calculation (indicated as "true" in FIG. 7B) are order 505 and shipping address 507, as outlined conceptually in the "Include=true" boxes.

Figure 8:
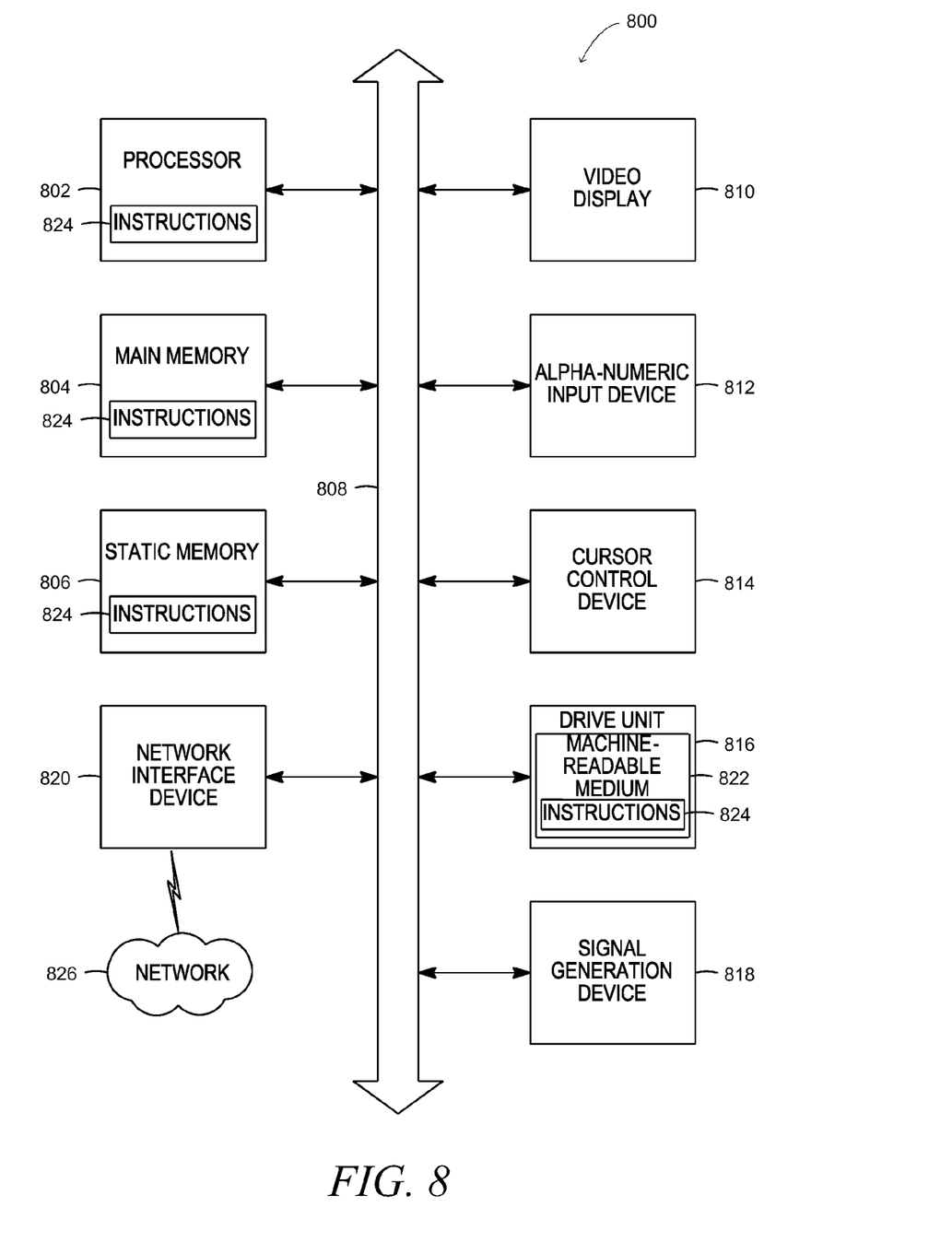
FIG. 8 shows a diagrammatic representation of a machine in the example form of a computer system within which a set of instructions, for causing the machine to perform any one or more of the methodologies discussed herein, may be executed.

FIG. 8 shows a diagrammatic representation of a machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions 624 (e.g., software) embodying any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to browse an electronic marketplace, place items of interest into a shopping cart, selectively purchase one or more items in the shopping cart without having to remove the non-selected items from the shopping cart, and automatically retain the non-selected items in the shopping cart for future access has been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method in a networked publication system, the method comprising:
   receiving a query from a client machine, via a wireless communication channel;
   transmitting to the client machine, via the wireless communication channel and in response to the query, a set of components that comprises a fixed query response representation to the query, the set of components representing first information and represented by a set of selectable icons on a user interface of the client machine;
   receiving from the client machine, via a hardware network interface, data signals representing the selection of fewer than all of the set of selectable icons that were transmitted to the client machine, the selected icons designating a subset of components from the set of components of the fixed query response representation, the subset representing second information that comprises less information than the first information;
   performing, by at least one hardware processor, a map/reduce function on the received data signals to obtain the subset of components; and
   transmitting the subset of components to the client machine via the wireless communication channel.

2. The method of claim 1 wherein the received data signals comprise an Xpath expression that is created by at least one hardware processor at the client machine responsive to the selected icons.

3. The method of claim 1 further including creating an Xpath expression responsive to receiving the data signals.

4. The method of claim 1 wherein the map/reduce function comprises reducing according to a design pattern.

5. The method of claim 4 wherein the map/reduce function calculates the design pattern as the subset of components in a fixed query response representation designated by the client machine.

6. The method of claim 1 wherein receiving the data signals comprises receiving an Xpath/MapReduce expression from the client machine.

7. The method of claim 1 wherein the map/reduce function comprises a map component and a reduce component.

8. The method of claim 7 wherein the map component comprises a master processor node partitioning at least some of the received data signals into smaller computation problems and distributing the smaller computation problems to at least one worker processor node.

9. The method of claim 7 wherein the reduce component comprises the master processor node collecting the answers to the smaller computation problems and combining them to form the subset of components.

10. The method of claim 1 wherein the data signals are in the form of a Key <-> Value map, the Key storing an Xpath expression or a map function and the Value storing a reduce function.

11. A machine-readable hardware storage device having embedded therein a set of instructions which, when executed by a machine, causes execution of operations comprising:
    receiving a query from a client machine, via a wireless communication channel;
    transmitting to the client machine, via the wireless communication channel and in response to the query, a set of components that comprises a fixed query response representation to the query, the set of components representing first information and represented by a set of selectable icons on a user interface of the client machine;
    receiving from the client machine, via a hardware network interface, data signals representing the selection of fewer than all of the set of selectable icons that were transmitted to the client machine, the selected icons designating a subset of components from the set of components of the fixed query response representation, the subset representing second information that comprises less information than the first information;
    performing, by at least one hardware processor, a map/reduce function on the received data signals to obtain the subset of components; and
    transmitting the subset of components to the client machine via the wireless communication channel.

12. The machine-readable hardware storage device of claim 11 wherein the received data signals comprise an Xpath expression that is created by at least one hardware processor at the client machine responsive to the selected icons.

13. The machine-readable hardware storage device of claim 11 further including creating an Xpath expression responsive to receiving the data signals.

14. The machine-readable hardware storage device of claim 11 wherein the reducing is performed according to a design pattern.

15. The machine-readable hardware storage device of claim 14 wherein the map/reduce function calculates the design pattern as the subset of components in a fixed query response representation designated by the client machine.

16. The machine-readable hardware storage device of claim 11, wherein the receiving the data signals comprises receiving an Xpath/MapReduce expression from the client machine.

17. The machine-readable hardware storage device of claim 11 wherein map/reduce function comprises a map component and a reduce component.

18. The machine-readable storage hardware device of claim 17 wherein the map component comprises a master processor node partitioning at least some of the data signals into smaller computation problems and distributing the smaller computation problems to at least one worker processor node.

19. The machine-readable hardware storage device of claim 17 wherein the reduce component comprises the master processor node collecting the answers to the smaller computation problems and combining them to form the subset of components.

20. The machine-readable hardware storage device of claim 11 wherein the data signals are in the form of a Key <-> Value map, the Key storing an Xpath expression or a map function and the Value storing a reduce function.

21. A networked publication system comprising:
one or more hardware processors configured to include:
a receiver that receives a query from a client machine;
a transmission module that transmits to the client machine, in response to the query, a set of components that comprises a fixed query response representation to the query, the set of components representing first information and represented by a set of selectable icons on a user interface of the client machine;
the receiver configured to receive from the client machine, via a network interface, data signals representing the selection of fewer than all of the set of selectable icons that were transmitted to the client machine, the selected icons designating a subset of components of the set of components of the fixed query response representation, the subset representing second information that comprises less information than the first information; and
a processor module that performs a map/reduce function on the selected data signals to retrieve the subset of components,
the transmission module configured to transmit the subset of components to the client machine.

22. The publication system of claim 21 wherein the received data signals comprise an Xpath expression that is created by at least one hardware processor at the client machine responsive to the selected icons.

23. The publication system of claim 21 further including creating an Xpath expression responsive to receiving the data signals.

24. The publication system of claim 21 wherein the reducing is performed according to a design pattern.

25. The publication system of claim 24 wherein the map/reduce function calculates the design pattern as the subset of components in a fixed query response representation designated by the client machine.

26. The publication system of claim 21, the receiving the data signals comprises receiving an Xpath/MapReduce expression from the client machine.

27. A method in a networked publication system, the method comprising:
receiving from a client machine, via a wireless data channel, a query for a set of components that comprises a fixed query response representation for the query, the set of components for obtaining first information;
transmitting, via the wireless channel, to the client machine, in response to the query, the set of components that comprises the fixed query response representation to the query and that are represented by selectable icons on a user interface of the client machine;
transmitting to the client machine for complete or partial operation, one or more of (1) a query language module for responding to Xpath operations and Map/Reduce operations, or (2) a design pattern module for following a design pattern to support a response manipulation language;
receiving from the client machine data resulting from the complete or partial operation at the client machine of the one or more of (1) a query language module for responding to Xpath operations and Map/Reduce operations, or (2) a design pattern module for following a design pattern to support a response manipulation language, the data representing selection of a subset of the set of selectable icons that were transmitted to the client machine, the selected icons designating a subset of the set of components of the fixed query response representation that represent second information that comprises less information than the first information;
responsive to the received data, performing one or more functions for retrieval of the subset of components and transmitting the subset of components to the client machine via the wireless data channel.

28. A machine-readable hardware storage device having embedded therein a set of instructions which, when executed by a machine, causes execution of operations comprising:
receiving from a client machine, via a wireless data channel, a query for a set of components that comprises a fixed query response representation for the query, the set of components for obtaining first information;
transmitting, via the wireless channel, to the client machine, in response to the query, the set of components that comprises the fixed query response representation to the query, the set represented by selectable icons on a user interface of the client machine;
transmitting to the client machine for complete or partial operation, one or more of (1) a query language module for responding to Xpath operations and Map/Reduce operations, or (2) a design pattern module for following a design pattern to support a response manipulation language;
receiving from the client machine data resulting from the complete or partial operation at the client machine of the one or more of (1) a query language module for responding to Xpath operations and Map/Reduce operations, or (2) a design pattern module for following a design pattern to support a response manipulation language, the data representing selection of a subset of the set of selectable icons that were transmitted to the client machine, the selected icons designating a subset of the set of components of the fixed query response representation that represent second information that comprises less information than the first information;

responsive to the received data, performing one or more functions for retrieval of the subset of components and transmitting the subset of components to the client machine via the wireless data channel.

* * * * *